United States Patent
Seki et al.

(12)

(10) Patent No.: US 6,629,165 B1
(45) Date of Patent: Sep. 30, 2003

(54) PROGRAMMABLE CONTROLLER INCLUDING INTELLIGENT MODULE

(75) Inventors: Kenji Seki, Funabashi (JP); Atsushi Ito, Shiroimachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/576,601

(22) Filed: May 24, 2000

(30) Foreign Application Priority Data

May 27, 1999 (JP) .......................................... 11-147660

(51) Int. Cl.[7] ................................................ G06F 3/00
(52) U.S. Cl. .............................. 710/36; 710/13; 710/18; 712/225
(58) Field of Search ........................... 710/1, 23, 36, 710/29, 2, 13, 18, 31, 41, 65, 101; 709/100, 202, 209; 712/28, 31, 34, 246, 225, 226

(56) References Cited

U.S. PATENT DOCUMENTS

| | | | |
|---|---|---|---|
| 4,521,871 A | * 6/1985 | Galdun et al. | 364/900 |
| 5,164,894 A | * 11/1992 | Cunningham et al. | 700/2 |
| 5,200,890 A | * 4/1993 | Pionchon | 700/91 |
| 5,225,974 A | * 7/1993 | Mathews et al. | 700/11 |
| 5,276,799 A | * 1/1994 | Rivshin | 345/502 |
| 5,291,391 A | * 3/1994 | Mead et al. | 700/28 |
| 5,408,229 A | * 4/1995 | Yabusaki et al. | 340/825.5 |
| 5,416,908 A | * 5/1995 | DiCarlo et al. | 395/275 |
| 5,918,067 A | * 6/1999 | Kamei et al. | 710/5 |

FOREIGN PATENT DOCUMENTS

| | | |
|---|---|---|
| JP | 147656 | 6/1989 |
| JP | 6259116 | 9/1994 |

* cited by examiner

Primary Examiner—Jeffrey Gaffin
Assistant Examiner—Rijue Mai
(74) Attorney, Agent, or Firm—Antonelli, Terry, Stout, & Kraus, LLP

(57) ABSTRACT

A programmable controller (PLC) facilitates modifications to programs running thereon, readily accommodates addition and removal of intelligent modules contained therein, and offers good maintenanceability. For modifying programs in a conventional PLC which incorporates intelligent modules, programs in each of the intelligent modules must be modified since programs are individually inputted to the respective intelligent modules, thus giving rise to a problem in that an increased amount of works are required. In the PLC of the present invention, a processing unit of an intelligent module is configured equivalent to a processing unit of a CPU module, and registers and memories of respective intelligent modules are allocated in a memory map of the CPU module to build a hardware configuration which allows the processing unit of the CPU module to read and write the registers and memories of the respective intelligent modules, so that the intelligent modules can be controlled in a manner similar to the CPU module. Software running on the CPU module is additionally provided with instructions which indicate that they are executed in an intelligent module but can be processed either by the CPU module or by the intelligent module.

2 Claims, 7 Drawing Sheets

| bit3 | bit2 | bit1 | bit0 | MODULE TYPE |
|---|---|---|---|---|
| 0 | 0 | 0 | 1 | INPUT MODULE |
| 0 | 0 | 1 | 0 | OUTPUT MODULE |
| 1 | 1 | 0 | 0 | INTELLIGENT MODULE (COUNTER MODULE) |

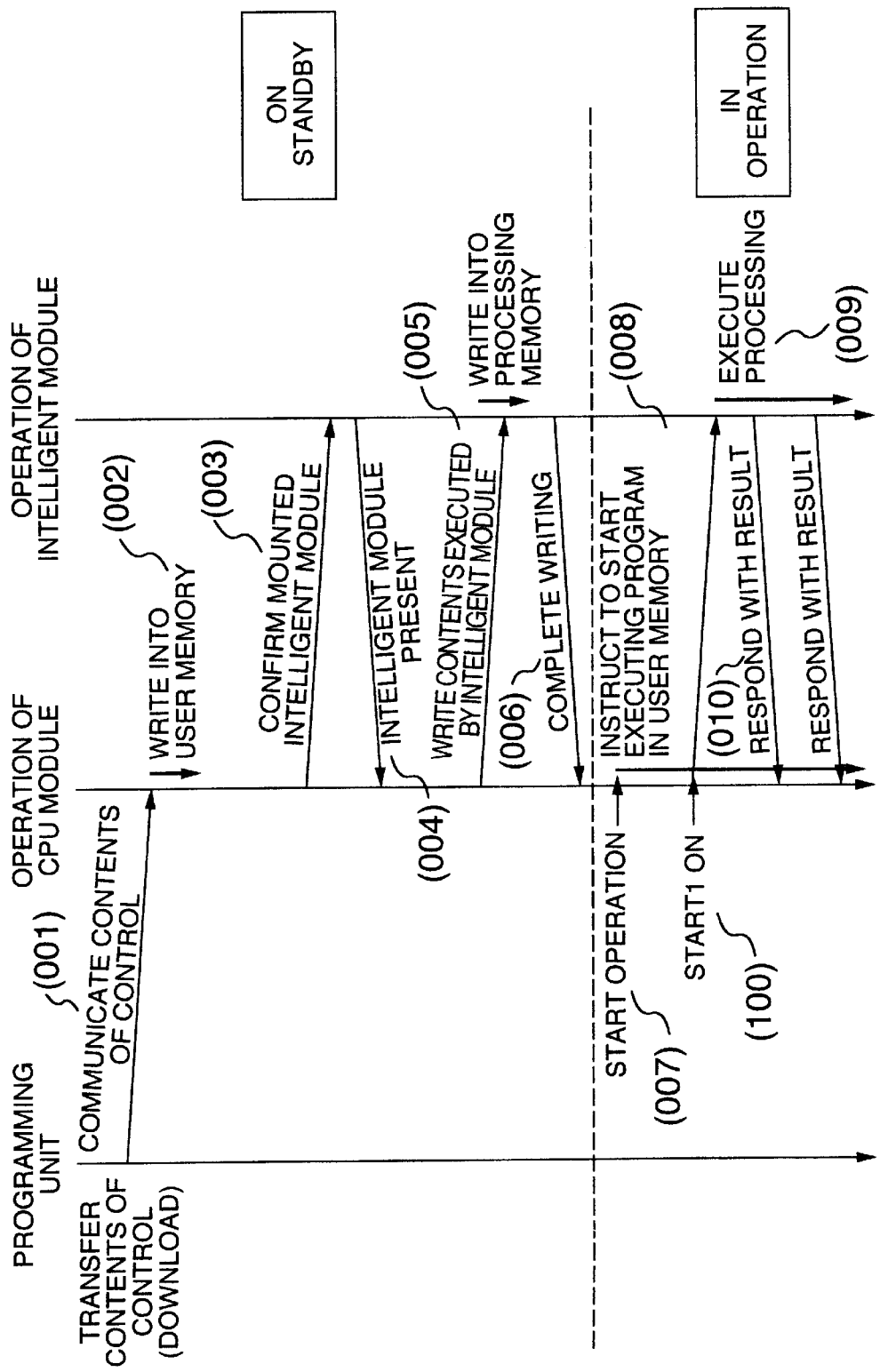

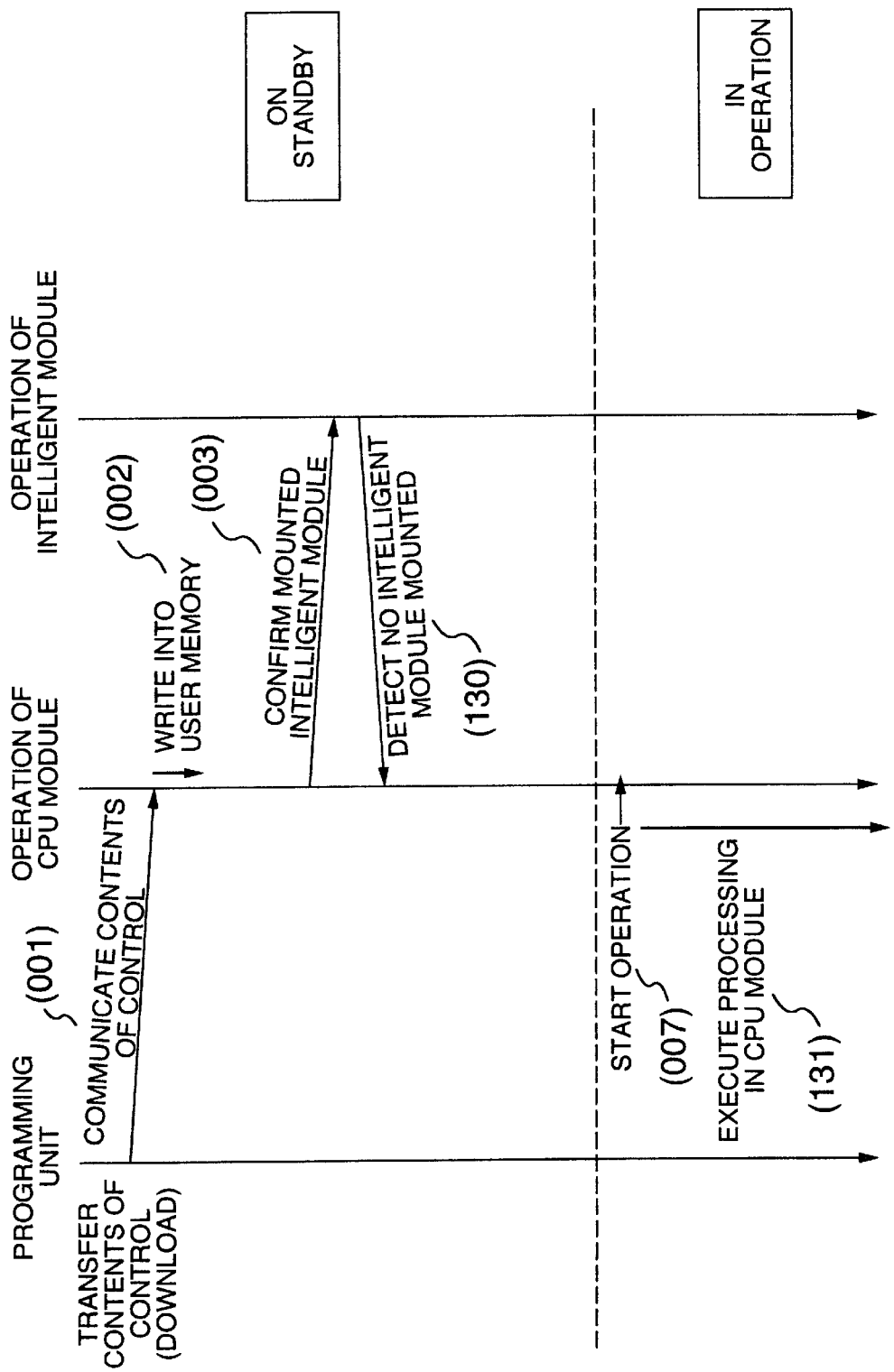

PROGRAMMABLE CONTROLLER INCLUDING INTELLIGENT MODULE

BACKGROUND OF THE INVENTION

The present invention relates generally to a programmable controller (hereinafter abbreviated as the "PLC") which is configured such that intelligent modules can be connected thereto, and more particularly to the processing of user programs for a CPU module and such intelligent modules.

A prior art PLC will be first described with reference to FIG. 2. Generally, the PLC is programmed by the user using an appropriate peripheral device such that the PLC performs operations desired by the user. A program for use with the PLC is transferred to a CPU module 1 through a peripheral device connected thereto, and stored in a user memory 3 within the CPU module 1 or in a memory of a separate storage module. This program is executed by a processing unit 2 in the CPU module 1.

An intelligent module 5 may be incorporated in the PLC when it is desired to realize a control which exhibits superior response performance. This module has a unique program system and therefore operates independently of programs stored in the CPU module 1. For this reason, the intelligent module 5 only communicates data with the CPU module 1 through a system bus 9 and a PI/O bus 9'. As illustrated in FIG. 2, assume that a switch is turned on in a user program stored in the user memory 3 to start a device connected thereto, causing a program 13 to start running on the intelligent module 5 (a starting condition 10). Since this program 13 is stored only in a processing memory 7 of the intelligent module 5, the program 13 is not executed when the intelligent module 5 is not mounted in the PLC. For processing the program 13 even when the intelligent module 5 is not mounted in the same manner as when it is mounted, a modification is required to the user program in the CPU module 1 to add the contents of the program 13 to the user program.

The programming of the intelligent module 5 involves creating a program in a peripheral device, connecting the peripheral device to the intelligent module 5 to transfer the program thereto, and storing the program in the processing memory 7 within the intelligent module 5, as is the case of the programming of the CPU module 1. Thus, when the intelligent module 5 is used as a component forming part of the PLC, the user is required to create a program for the intelligent module 5 separately from a user program stored in the CPU module 1, and to store the created program in the processing memory 7 within the intelligent module 5.

When the intelligent module or modules 5 are added to the PLC with an intention of realizing a control which exhibits superior response performance, settings and operation contents are described individually in each intelligent modules as does the prior art example. As a larger number of intelligent modules are mounted in the PLC, more complicated works are required for changes and modifications.

Specifically, since a program for use in the intelligent program 5 is independent of a program for use in the CPU module 1, respective programs must be installed individually into associated modules, and any modification to a user program in the intelligent module 5 is impossible from the CPU module 1. For this reason, if the PLC does not perform any intended operation upon starting up the system possibly due to some program related cause, a plurality of programs must be modified for respective intelligent modules, thus burdening the user with tedious works.

On the other hand, if the intelligent module 5 is to be removed from a system which has a program configuration in such a manner that the intelligent module 5 is dedicated to operations on input/output data, and the CPU module 1 performs subsequent operations using the results of the operations performed by the intelligent module 5, the processing so far performed by the intelligent module 5 must be added to a use program of the CPU module 1. In consideration of time and labor required to modify associated programs, the system configuration cannot be readily changed.

In some PLC applications, a local PLC may be linked with a remote PLC utilizing a communication module or the like. In this case, a program in a CPU module of the remote PLC can be modified from the local CPU module through the communication module. However, the intelligent module stores programs independent of the CPU module, so that if the remote PLC is mounted with some intelligent module, the operator must go to the location of the remote PLC for modifying relevant programs stored in the intelligent module.

SUMMARY OF THE INVENTION

It is therefore an object of the present invention to provide a programmable controller which facilitates modifications to programs running thereon, readily accommodates addition and removal of intelligent modules contained therein, and offers good maintenanceability.

To achieve the above object, the present invention provides a programmable controller comprising a CPU module and an input/output module, and adapted to be connectable with an intelligent module, wherein the CPU module includes a user memory and a processing unit, and the processing unit has a function of determining whether an instruction in an inputted user program should be processed by the CPU module or the intelligent module.

In the programmable controller of the present invention, when the intelligent module is connected to the programmable controller, the CPU module is responsive to the processing unit determining that an inputted user program includes instructions to be executed by the intelligent module to transfer a pertinent portion of the user program to the intelligent module such that a processing unit in the intelligent module processes the portion.

Also, in the programmable controller of the present invention, when no intelligent module is connected to the programmable controller, the CPU module is responsive to the processing unit determining that an inputted user program includes instructions to be executed by the intelligent module to process the pertinent portion of the user program.

BRIEF DESCRIPTION OF THE DRAWINGS

FIG. 7 is a flow diagram illustrating a control flow executed when an intelligent module is mounted in the PLC according to the embodiment of FIG. 1; and FIG. 8 is a flow diagram illustrating a control flow executed when no intelligent module is mounted in the PLC according to the embodiment of FIG. 1.

DETAILED DESCRIPTION OF THE EMBODIMENTS

Figure 1:
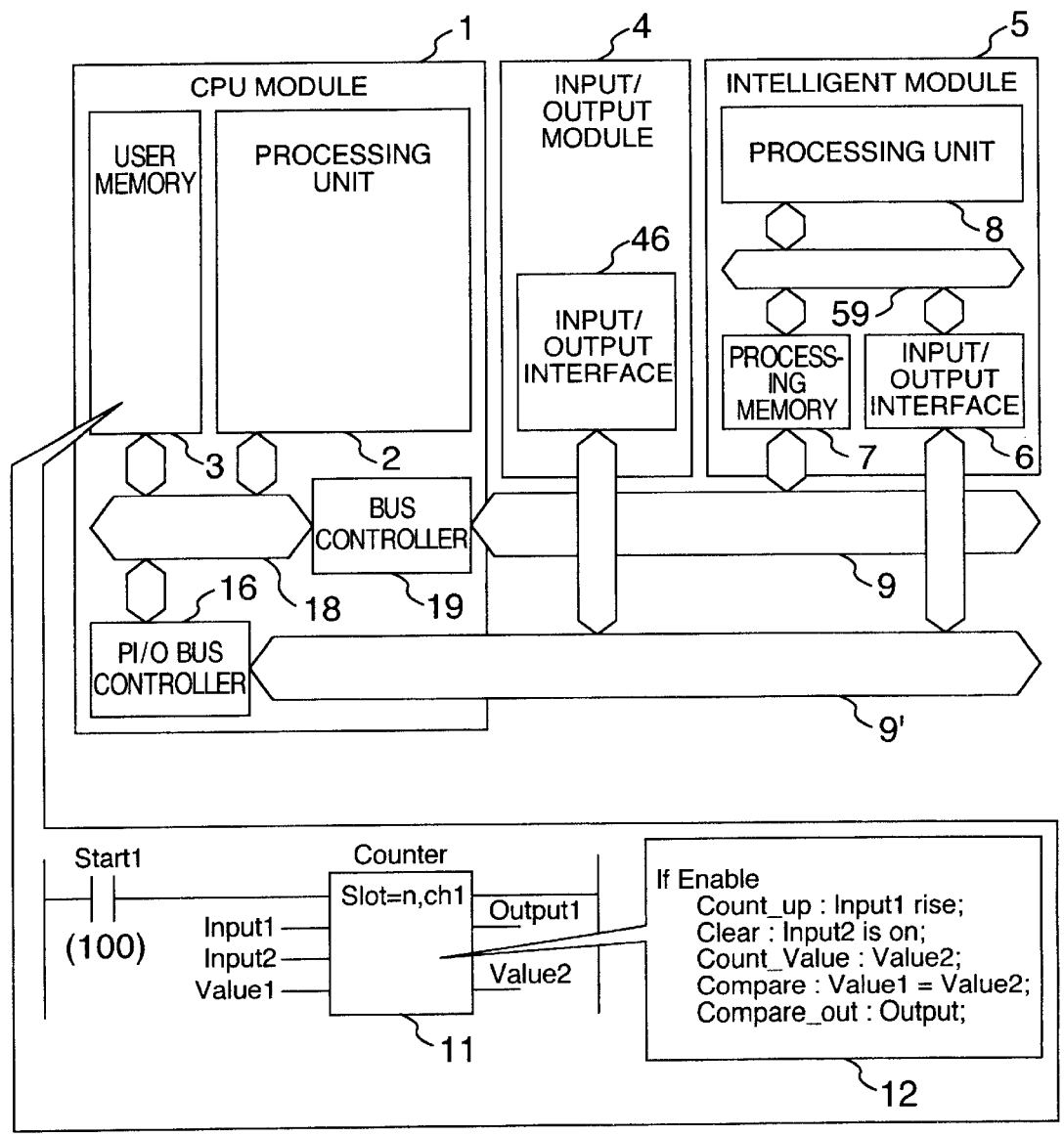
FIG. 1 is a block diagram illustrating the configuration of a programmable controller (PLC) according to an embodiment of the present invention.
Figure 2:
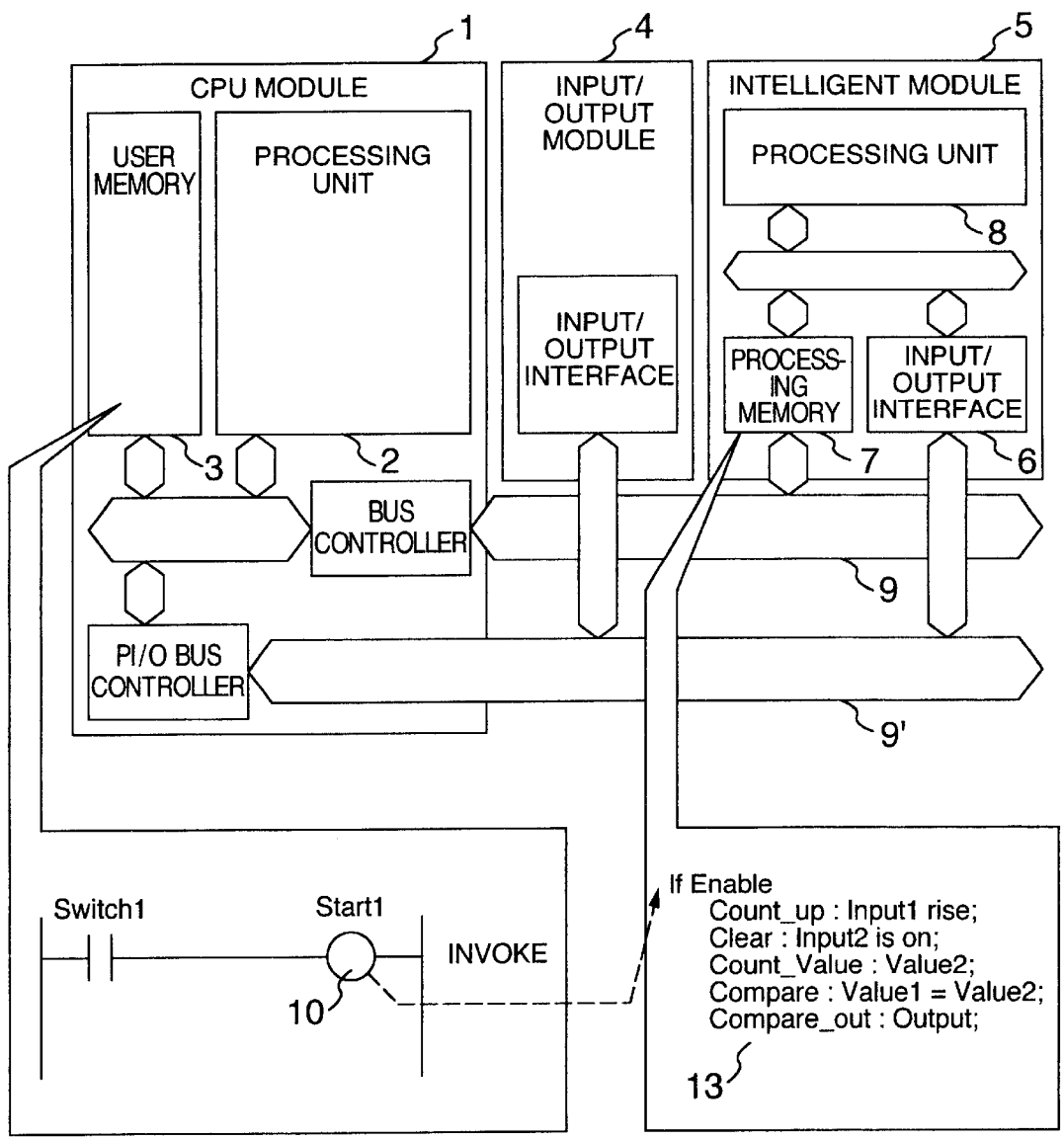
FIG. 2 is a block diagram illustrating the configuration of a conventional PLC.

The present invention will hereinafter be described in conjunction with an embodiment thereof with reference to FIGS. 1 and 3 to 8. FIG. 1 is a block diagram illustrating the configuration of a programmable controller (PLC) according to an embodiment of the present invention. The illustrated PLC, which is generally called a "modular type," is provided with modules, individually having different functions, which are plugged into slots (not shown) of a mother board (not shown) on the back side of the PLC. In this embodiment, the PLC is configured by a CPU module 1, an input/output module 4 and an intelligent module 5 connected to a system bus 9 and a PI/O bus 9' which provide signal paths on the mother board. Generally, the PLC includes one CPU module 1, and one or more of input/output modules 4 and intelligent modules 5 both as required for particular applications.

The CPU module 1 comprises a processing unit 2; a user memory 3; a bus controller 19; and a PI/O bus controller 16. The processing unit 2, the user memory 3, the bus controller 19 and the PI/O bus controller 16 are interconnected through an internal bus 18 of the CPU module 1, so that they can communicate data therebetween.

The input/output module 4 comprises an input/output interface 46. This input/output interface 46 is connected to the PI/O bus controller 16 of the CPU module 1 through the PI/O bus 9'. The input/output module 4 is generally a module having a single function such as an input module or an output module, and is provided with an input interface when it functions as an input module and with an output interface when it functions as an output module, respectively. In this embodiment, at least one input module and at least one output module are used in combination. Alternatively, a single module capable of simultaneously handling input and output may be used. In the following description, these modules are collectively called the "input/output module" and the "input/output interface," respectively.

Figures 3, 4:
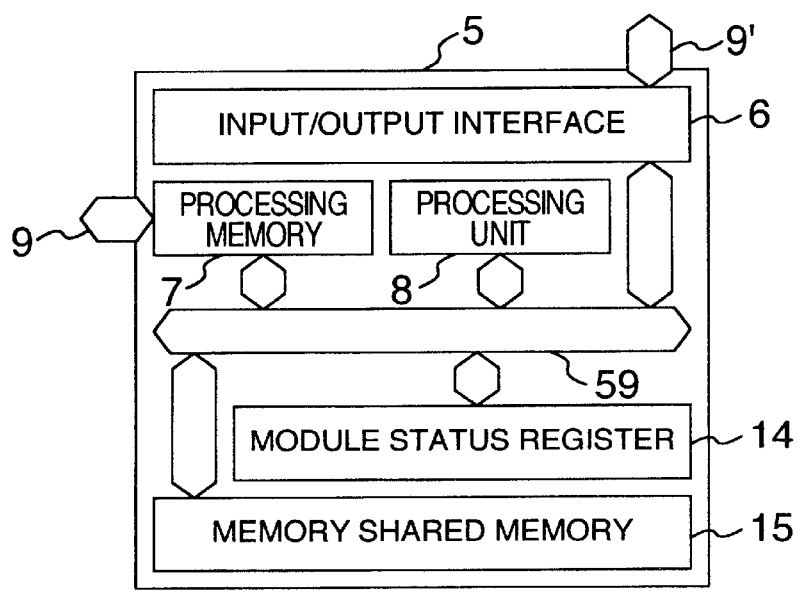
FIG. 3 is a block diagram illustrating the configuration of an intelligent module for use with the PLC according to the embodiment of FIG. 1.
FIG. 4 is a table showing examples of information stored in a module status register of the PLC according to the embodiment of FIG. 1.

As illustrated in detail in FIG. 3, the intelligent module 5 comprises a processing unit 8; a processing memory 7, an input/output interface 6; a module status register 14; and a module shared memory 15. The processing unit 8, the processing memory 7 and the input/output interface 6 are interconnected through an internal bus 59 of the intelligent module 5. The processing memory 7 is connected to the bus controller 19 of the CPU module 1 through the system bus 9. The input/output interface 6 is connected to the PI/O bus controller 16 of the CPU module 1 through the PI/O bus 9'. The input/output interface 6 communicates with peripheral devices and so on. The processing memory 7 stores a user program. The processing unit 8 runs the user program to perform associated operations. The module status register 14 stores information on the mounted module. The module shared memory 15 stores input and output data, and so on which are shared by other modules.

The intelligent module 5 may be incorporated in the PLC when it is desired to realize a control which exhibits superior response performance. The intelligent module 5 has a unique program system independent of programs stored in the CPU module 1, and therefore performs operations independent of the CPU module 1, and transmits and receives data to and from the CPU module 1 through the system bus 9.

When the intelligent module 5 is incorporated into the PLC as a part of its configuration, the user creates a program to be processed by the intelligent module 5, and stores the created program in the processing memory 7 within the intelligent module 5. In this embodiment, the program is created in a programmer (not shown) adapted for connection to the CPU module 1, and transferred from the programmer to the CPU 1 for storage in the user memory 3 within the CPU module 1. Subsequently, the program is transferred to the intelligent module 5 and stored in the processing memory 7 therein.

In the PLC of this embodiment, the CPU module 1, the input/output module 4 and the intelligent module 5 are connected to the system bus 9 and the PI/O bus 9', so that data can be transmitted and received among one another. While the processing unit 2 of the CPU module 1 generally serves to control input/output and so on in accordance with the user program, the intelligent module 5 may also conduct such control associated with input/output and so on. Since input/output data is stored in a memory shared by both modules, any data in the memory rewritten by one module is reflected to the programs of both modules. Since the program of the intelligent module 5 is independent of the program of the CPU module 1, the intelligent module 5 can offer a control with superior responsibility.

Figure 5:
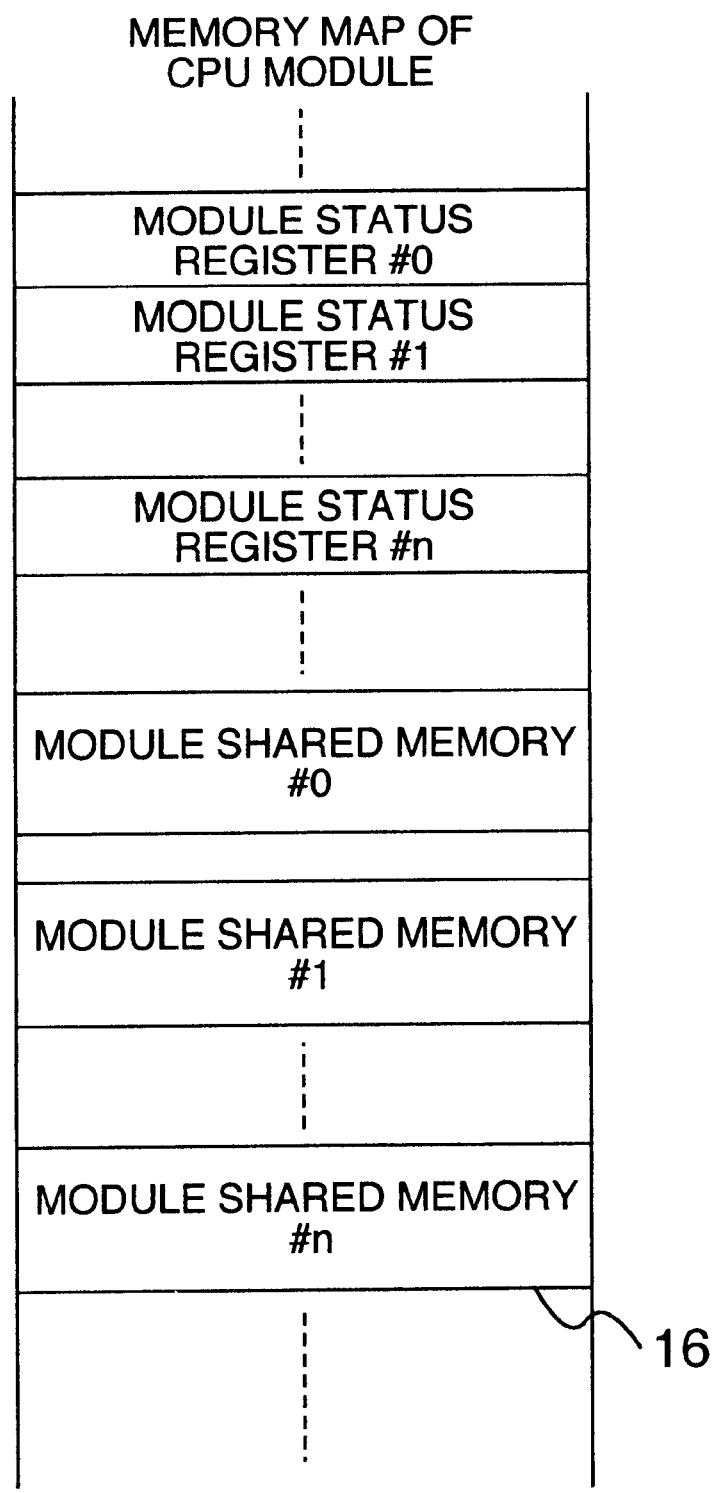
FIG. 5 shows a memory map for a CPU module in the PLC according to the embodiment of FIG. 1.
Figure 6:
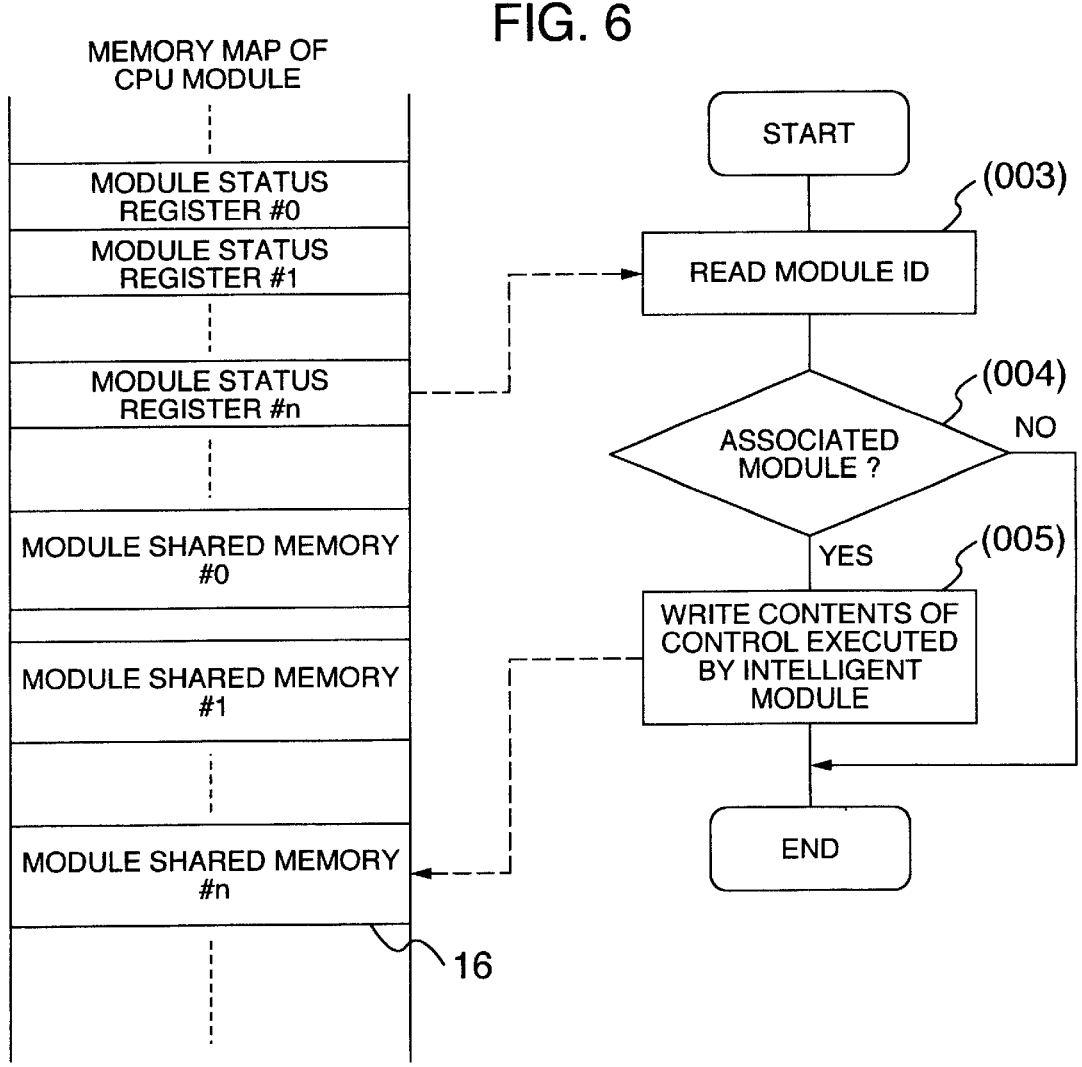
FIG. 6 is a diagram showing the relationship between the memory map for the CPU module and a processing flow executed by the CPU module in the PLC according to the embodiment of FIG. 1.

FIGS. 5 and 6 show a memory map for the CPU module 1, and the relationship between this memory map and the operation of the CPU module 1 in this embodiment. As shown in FIG. 5, the user memory 3 of the CPU module 1 is segmented into an area for storing the contents of the module status register 14 in the intelligent module 5, and an area for storing the contents of the module shared memory 15 so as to form a memory map 16, thus implementing a hardware configuration which enables the processing unit 2 of the CPU module 1 to write and read into and from the user memory 3. FIG. 6 shows the relationship between a sequence of operations performed by the CPU module 1 when the PLC is mounted with the intelligent module 5, and the contents stored in the memory map which are accessed during these operations. Since the processing unit 8 in the intelligent module 5 has an equivalent configuration to the processing unit 2 in the CPU module 1, the intelligent module 5 may be controlled in a manner similar to the CPU module 1.

As illustrated in FIG. 1, the user memory 3 also stores an instruction box 11 indicative of instructions executed by the intelligent module 5 as the processing assigned to the software on the CPU module 1. Instructions stored in the instruction box 11 are those instructions constituting a program 12 which can be executed either by the CPU module 1 or by the intelligent module 5, and typically a plurality of instructions for performing certain processing (hereinafter called the "common program"). FIG. 1 shows an example of the common program 12 stored in the instruction box 11. The form of representation used in the instruction box 11 handles the contents of processing as one group called a "function block" and is a notation standardized worldwide in IEC1131-3.

There are a wide variety of intelligent modules available, and FIG. 1 shows a counter module as one example.

"Slot=n, ch1" written in the instruction box 11 in FIG. 1 indicates a channel 1 in an $n^{th}$ slot (n is a positive integer)

formed in the buses 9, 9', and refers to instructions executed by the intelligent module 5 plugged in the $n^{th}$ slot. Specifically, the instructions in the instruction box 11 represent specific processing in which an input pulse is entered in Input1; a count value clear in Input2; and a set value in Value1, respectively, and a match output Output1 is outputted when Value2, which is counted up each time an input pulse is entered, matches the set value Value1. While FIG. 1 shows the processing in the counter module, the contents of the processing performed by the common program 12 stored in the instruction box 11 may be actually determined by the user at his discretion.

The CPU module 1 determines in software whether or not each instruction in the common program 12 created by the user and stored in the instruction box 11 should be executed by the intelligent module 5. This determination is made by previously entering information on a module or modules, possibly participating in the processing, in the instruction box 11. If any instruction to be executed by the intelligent module 5 is found in the user program, the CPU module 1 references a previously read table in the module status registers of intelligent modules mounted in the PLC, to determine whether or not the associated intelligent module 5 is plugged in a specified slot. If the intelligent module 5 is plugged in the slot, the common program 12 is transferred to the intelligent module 5, while the CPU module 1 monitors input and output with the intelligent module 5 instead of executing the common program 12. If the intelligent module 5 is not plugged in the slot, the CPU module 1 has the processing unit 2 run the common program 12.

The intelligent module 5, on the other hand, has a hardware configuration for storing the common program 12 transferred thereto from the CPU module 1 in the processing memory 7, and software for controlling the hardware configuration. In the intelligent module 5, the processing executed by the processing unit 8 to read the common program 12 stored in the processing memory 7 and run the same is performed in a manner similar to the processing executed by the processing unit 2 of the CPU module 1 to read the common program stored in the user memory 3 and execute the same. Therefore, the processing unit 8 of the intelligent module 5 can be controlled in the same manner as the processing unit 2 of the CPU module 1, and the common program 12 stored in the instruction box 11 may be processed either by the intelligent module 5 or by the CPU module 1.

In this embodiment, since the intelligent module 5 and the CPU module 1 are configured as described above, a common program executed by the intelligent module 5 may be stored in the user memory 3 of the CPU module 1 such that the CPU module 1 collectively manages common programs. The CPU module 1 can discriminate the type of a particular module mounted therein by reading the module status register 14 of the module. In this embodiment, the CPU module 1 may discriminate each module in the following manner.

The module status register 14 has binary information comprised of several bits, which is unique to each type, so that the CPU module 1 discriminates the type of module in accordance with a pattern represented by the binary information. FIG. 4 shows examples of such bit patterns when the binary information is comprised of four bits.

FIG. 4 shows an example of the binary information indicative of an input module, an output module and an intelligent module. Binary information "0001" is stored for an input module in the module status register 14; "0010" for an output module; and "1100" for an intelligent module, respectively. In this event, when the CPU module 1 reads information "1100" from the status register 14, the CPU module 1 determines that the associated module is an intelligent module.

This method allows the user to manage only programs stored in the CPU module 1, thereby eliminating a tedious work which would otherwise be required in the prior art to modify programs. Also, since the user program is handled irrespective of the presence or absence of the intelligent module 5, the intelligent module 5 can be readily removed from the PLC system.

Next, the operation of the PLC when it is mounted with the intelligent module 5 will be described with reference to FIGS. 6 to 8. FIG. 6 shows the relationship between the memory map and the operation of the PLC, and FIGS. 7, 8 are flow diagrams illustrating the operation of the PLC when it is mounted with the intelligent module 5 and when it is not mounted with the intelligent module 5, respectively. First, the operation of the PLC when mounted with the intelligent module is described with reference to FIG. 7. The user creates a control program in a peripheral device (programmer), and transfers the created control program to the CPU module 1 (001). The CPU module 1 writes the transferred user program into the user memory 3 (002), and subsequently reads information on mounted I/O devices from the module status register 14 (003) to confirm whether or not the intelligent module 5 is mounted in the PLC. When the CPU module 1 determines that the intelligent module 5 is mounted (004), the CPU module 1 transfers a portion of the user program executed by the intelligent module 5 (common program 12) to the intelligent module 5 (005). As the common program 12 transferred to the intelligent module 5 has been written into the processing memory 7 (006) to allow the user to start operating (007), the CPU module 1 operates in accordance with the program held in the user memory 3. The CPU module 1 instructs the intelligent module 5 to start processing (008) when a program execution start condition for the intelligent module 5 is established in the CPU module 1 during the operation (100) (corresponding to a joint (100) connected to the instruction box 11 in FIG. 1). The intelligent module 5 executes the processing in accordance with the program previously transferred from the CPU module 1 (009), and returns the result to the CPU module 1 (010). The intelligent module 5 may return the result to the CPU module 1 several times depending on the contents of the processing.

Next, the operation of the PLC when it is not mounted with the intelligent module 5 will be described with reference to FIG. 8. The user creates a control program in a peripheral device, and transfers the created program to the CPU module (001). The CPU module 1 writes the transferred user program into the user memory 3 (002), and reads information on mounted I/O devices (003). If the information indicates that no intelligent module 5 is mounted (130), the CPU module 1 does not transfer a common program 12 included in the user program to the intelligent module 5. Subsequently, as the user starts operating (007), the CPU module 1 operates in accordance with the program held in the user memory 3. When an execution condition for the common program 12 is established during the operation of the CPU module 1 (100), the CPU module 1 executes processing in accordance with the common program 12 instead of the intelligent module (131).

According to this embodiment, even when the PLC is mounted with a plurality of intelligent modules 5, the CPU module 1 can manage the operation of all the intelligent modules 5 only by modifying the contents of the user memory 3. Also, when no intelligent module is mounted, the CPU module 1 can process a program associated with an intelligent module even without modifying the contents of the user memory 3, thereby significantly improving the operability.

Further, when the PLC of this embodiment is applied to a system in which a local PLC is linked to a PLC located at a remote site (hereinafter called the "remote PLC") through a communication module or the like for use in a network environment, programs associated with a CPU module and an intelligent module or modules within the remote PLC can be managed only by manipulating a user memory in the CPU module within the remote PLC. It is therefore possible to change the operation of an intelligent module in the remote PLC by modifying a program in the CPU module within the remote PLC from a CPU module within the local PLC through the communication module.

As described above in detail, the present invention provides a programmable controller which facilitates modifications to programs running thereon, readily accommodates addition and removal of intelligent modules contained therein, and offers good maintenanceability.

What is claimed is:

1. A programmable controller comprising:
    a CPU module; and
    an input/output module,
    wherein each module is adapted to be connectable with an intelligent module,
    wherein said intelligent module is detachable, and equipped with a processing unit operable asynchronously with said CPU module for enabling unique operation of said intelligent module,
    wherein said CPU module includes a user memory and a processing unit, said processing unit included in said CPU module having a function of determining whether an instruction in an input user program should be processed by said CPU module or said intelligent module, and
    wherein when said intelligent module is connected to said programmable controller, said CPU module is responsive to a determination of said processing unit included in said CPU module that the input user program includes instructions to be executed by said intelligent module to transfer a pertinent portion of said user program to said intelligent module such that said processing unit included in said intelligent module processes said user program.

2. A programmable controller according to claim 1, wherein when said intelligent module is not connected to said programmable controller, said CPU module is responsive to determination of said processing unit that the inputted user program includes instructions to be executed by said intelligent module to process said pertinent portion of said user program.

* * * * *